US011157772B2

(12) United States Patent
Dia (10) Patent No.: US 11,157,772 B2
(45) Date of Patent: Oct. 26, 2021

(54) SYSTEM AND METHOD FOR GENERATING ADVERSARIAL EXAMPLES

(71) Applicant: ELEMENT AI INC., Montreal (CA)

(72) Inventor: Ousmane Dia, Montreal (CA)

(73) Assignee: ELEMENT AI INC., Montreal (CA)

( * ) Notice: Subject to any disclaimer, the term of this patent is extended or adjusted under 35 U.S.C. 154(b) by 139 days.

(21) Appl. No.: 16/665,005

(22) Filed: Oct. 28, 2019

(65) Prior Publication Data

US 2021/0124999 A1  Apr. 29, 2021

(51) Int. Cl.
*G06K 9/62* (2006.01)
*G06N 3/08* (2006.01)

(52) U.S. Cl.
CPC ......... *G06K 9/6257* (2013.01); *G06K 9/6206* (2013.01); *G06K 9/6262* (2013.01); *G06N 3/08* (2013.01)

(58) Field of Classification Search
None
See application file for complete search history.

(56) References Cited

U.S. PATENT DOCUMENTS

2018/0314917 A1\* 11/2018 Mehr .................... G06K 9/6274
2020/0210814 A1\* 7/2020 Mehr ....................... G06N 3/08

OTHER PUBLICATIONS

Dia, O. A., Barshan, E., & Babanezhad, R. (2019). Semantics Preserving Adversarial Learning. arXiv preprint arXiv:1903.03905. ( Year: 2019).\*
Lindqvist, B., Sugrim, S., & Izmailov, R. (2018). AutoGAN: Robust classifier against adversarial attacks. arXiv preprint arXiv: 1812.03405. (Year: 2018).\*
Office Action with regard to the counterpart CA Patent Application No. 3,060,613 dated Dec. 9, 2020.
Hwang et al., "PuVAE: A Variational Autoencoder to Purify Adversarial Examples", https://ieeexplore.ieee.org/document/8824108, IEEE Access, 2019, vol. 7, pp. 126582-126593.
Zhang et al., "Manifold Adversarial Learning", https://arxiv.org/abs/1807.05832v1, NIPS, 2018, pp. 1-9.
Liu et al., "Stein variational gradient descent: A general purpose Bayesian inference algorithm", Neural Information Processing Systems (NIPS), 2016, pp. 1-13.

\* cited by examiner

*Primary Examiner* — Fayyaz Alam
(74) *Attorney, Agent, or Firm* — BCF LLP (57) ABSTRACT

Methods and systems for generating adversarial examples are disclosed. The method comprises accessing a set of inputs and generating an instance of a variable auto-encoder (VAE), the instance of the VAE encoding the set of inputs into latent representation elements associated with a latent space. The method further comprises applying a manifold learning routine on the instance of the VAE to establish a characterization of a manifold in the latent space and applying a perturbation routine to generate perturbed latent representation elements while constraining the perturbed latent representation elements to remain within the manifold. The method further comprises generating adversarial examples based on the perturbed latent representation elements and outputting the adversarial examples.

20 Claims, 9 Drawing Sheets

INPUTS
702

CLEAN
RECON-
STRUCTION
704

ADVERSARIAL
EXAMPLES
706

| | |
|---|---|
| TRUE INPUT 1 | *P*: A biker races.<br>*H*: A PERSON IS RIDING A BIKE.<br>*Label*: ENTAILMENT |
| ADVERSARY | *H*: A MAN RACES. *Label*: CONTRADICTION |
| TRUE INPUT 2 | *P*: The girls walk down the street.<br>*H*: GIRLS WALK DOWN THE STREET.<br>*Label*: ENTAILMENT |
| ADVERSARY | *H*: A CHOIR WALKS DOWN THE STREET. *Label*: NEUTRAL |
| TRUE INPUT 3 | *P*: Two wrestlers in an intense match.<br>*H*: TWO WRESTLERS ARE COMPETING AND ARE BROTHERS.<br>*Label*: NEUTRAL |
| ADVERSARY | *H*: TWO WOMEN ARE PLAYING TOGETHER. *Label*: CONTRADICTION |
| TRUE INPUT 4 | *P*: A group of people celebrate their asian culture.<br>*H*: A GROUP OF PEOPLE CELEBRATE.<br>*Label*: ENTAILMENT |
| ADVERSARY | *H*: A GROUP OF PEOPLE CRUISING IN THE WATER. *Label*: NEUTRAL |
| TRUE INPUT 5 | *P*: Cheerleaders standing on a football field.<br>*H*: CHEERLEADERS ARE WEARING OUTSIDE.<br>*Label*: ENTAILMENT |
| ADVERSARY | *H*: PERSON STANDING ON A PLAYING FIELD. *Label*: NEUTRAL |
| TRUE INPUT 6 | *P*: People are enjoying food at a crowded restaurant.<br>*H*: PEOPLE ARE EATING IN THIS PICTURE.<br>*Label*: ENTAILMENT |
| ADVERSARY | *H*: PEOPLE ARE ENJOYING LOOKING AT A CROWDED RESTAURANT.<br>*Label*: CONTRADICTION |
| TRUE INPUT 7 | *P*: A wrestler celebrating his victory.<br>*H*: A WRESTLER WON A CHAMPIONSHIP.<br>*Label*: ENTAILMENT |
| ADVERSARY | *H*: A RIDER WON THE CHAMPIONSHIP.<br>*Label*: CONTRADICTION |

SYSTEM AND METHOD FOR GENERATING ADVERSARIAL EXAMPLES

FIELD

The present technology relates to systems and methods for generating adversarial examples. In particular, the present technology relates to systems and methods for generating adversarial examples that may be used in the context of training machine learning algorithms (MLAs).

BACKGROUND

MLA techniques typically involve developing models and algorithms that can learn from and make predictions based on input data. MLA include deep learning approaches which typically involve artificial neural networks with multiple layers, often referred to as deep neural networks (DNNs). DNNs comprise multiple layers of artificial neurons, which may be implemented as non-linear processing units, in which each successive layer uses the output of the previous layer as an input.

Recent developments in adversarial machine learning have raised concerns about the robustness of DNNs due to their vulnerability to attacks by the presence of subliminal signals in the input data which may cause serious harm by influencing the DNNs cognition functions. Such subliminal signals may take the form of low-intensity perturbations to input data (e.g., noise introduced to an image or permutations between words of a text) which may be unnoticeable to a human. Such subliminal signals may cause DNNs to misclassify their inputs and/or learn the wrong things from the environment and, as a result, make incorrect predictions. Input data perturbed by subliminal signals are typically referred to as adversarial examples.

One of the current approaches to improve resilience of DNNs to adversarial attacks involves synthetically generating adversarial examples. However, in order to provide any benefits, such synthetic adversarial examples need to be coherent, i.e., semantically coherent so as to convey the meaning of true input data. As a first example, in the image domain, adversarial examples need to be generated so as to be identical to real images and preserve location of fine details of the image. As a second example, in the text domain, adversarial examples need to be generated so as to be grammatically and linguistically correct. Current methods of generating such synthetic adversarial examples present limitations as they usually fail at generating coherent adversarial examples.

There is therefore a need for methods and systems for generating adversarial examples for MLAs which are coherent and/or capable of evading defenses known traditionally to be resilient to adversarial attacks.

SUMMARY

The present technology is directed to systems and methods for generating adversarial examples that may be deemed to be coherent and/or semantically meaningful. The adversarial examples generated in accordance with the present technology may be suitable for being used as part of a training routine of a MLA, such as, but without being limitative, a training routine of a neural network.

In accordance with some broad aspects of the present technology, the generating of such adversarial examples may allow fooling a classifier associated with a neural network, for example, in the context of black-box attacks" wherein an attacker has only access to the predictions of the classifier g and wants to construct adversarial examples not knowing the intricacies of g such as, for example but without being limitative, a loss function or a gradient. The adversarial examples generated in accordance with the present technology may allow evading defenses known traditionally to be resilient to adversarial attacks.

In accordance with some other broad aspects of the present technology, the generating of the adversarial examples may allow reinforcement of a classier by augmenting a set of training inputs with the generated adversarial examples. This result in a more robust training of the neural networks generated from the augmented set of training inputs.

In one broad aspect, there is provided a method for generating adversarial examples, the method comprising:
  accessing a set of inputs;
  generating an instance of a variable auto-encoder (VAE), the VAE comprising an encoder and a decoder, the instance of the VAE encoding the set of inputs into latent representation elements associated with a latent space, the latent representation elements representing low geometric summaries establishing semantics associated with the set of inputs;
  applying a manifold learning routine on the instance of the VAE to establish a characterization of a manifold in the latent space, the manifold being defined by the latent representation elements;
  applying a perturbation routine to generate perturbed latent representation elements while constraining the perturbed latent representation elements to remain within the manifold;
  generating adversarial examples based on the perturbed latent representation elements, the adversarial examples sharing a common semantics associated the set of inputs; and
  outputting the adversarial examples.

In another aspect, the adversarial examples are generated so as to fool a classifier associated with a neural network.

In another aspect, the adversarial examples are generated so to reinforce a classifier associated with a neural network.

In another aspect, the applying the manifold learning routine and the applying perturbation routine are executed as a unified routine.

In another aspect, the manifold learning routine comprises a variational inference routine executing learning of the manifold while minimizing assumptions about a distribution of the latent representation elements.

In another aspect, the manifold learning routine comprises a Stein Variational Gradient Descent (SVGD) routine to learn the manifold.

In another aspect, the perturbation routine comprise establishing a neighborhood of the latent representation elements which preserves semantics associated with the set of inputs.

In another aspect, constraining the perturbed latent representation elements to remain within the manifold comprises applying a Gram-Schmidt Basis Sign Method (GBSM) routine.

In another aspect, constraining the perturbed latent representation elements to remain within the manifold further comprises applying a manifold alignment routine.

In another aspect, the generating adversarial examples is performed by the decoder and comprises operating an inversion routine to reconstruct the adversarial examples from the perturbed latent representation elements.

In another aspect, the generating adversarial examples comprises optimizing a loss.

In other aspects, various implementations of the present technology provide a non-transitory computer-readable medium storing program instructions for executing one or more methods described herein, the program instructions being executable by a processor of a computer-based system.

In other aspects, various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device," a "computing device," an "operation system," a "system," a "computer-based system," a "computer system," a "network system," a "network device," a "controller unit," a "monitoring device," a "control device," a "server," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof which provides the required capabilities.

With these fundamentals in place, we will now consider some non-limiting examples to illustrate various implementations of aspects of the present technology.

Figure 1:
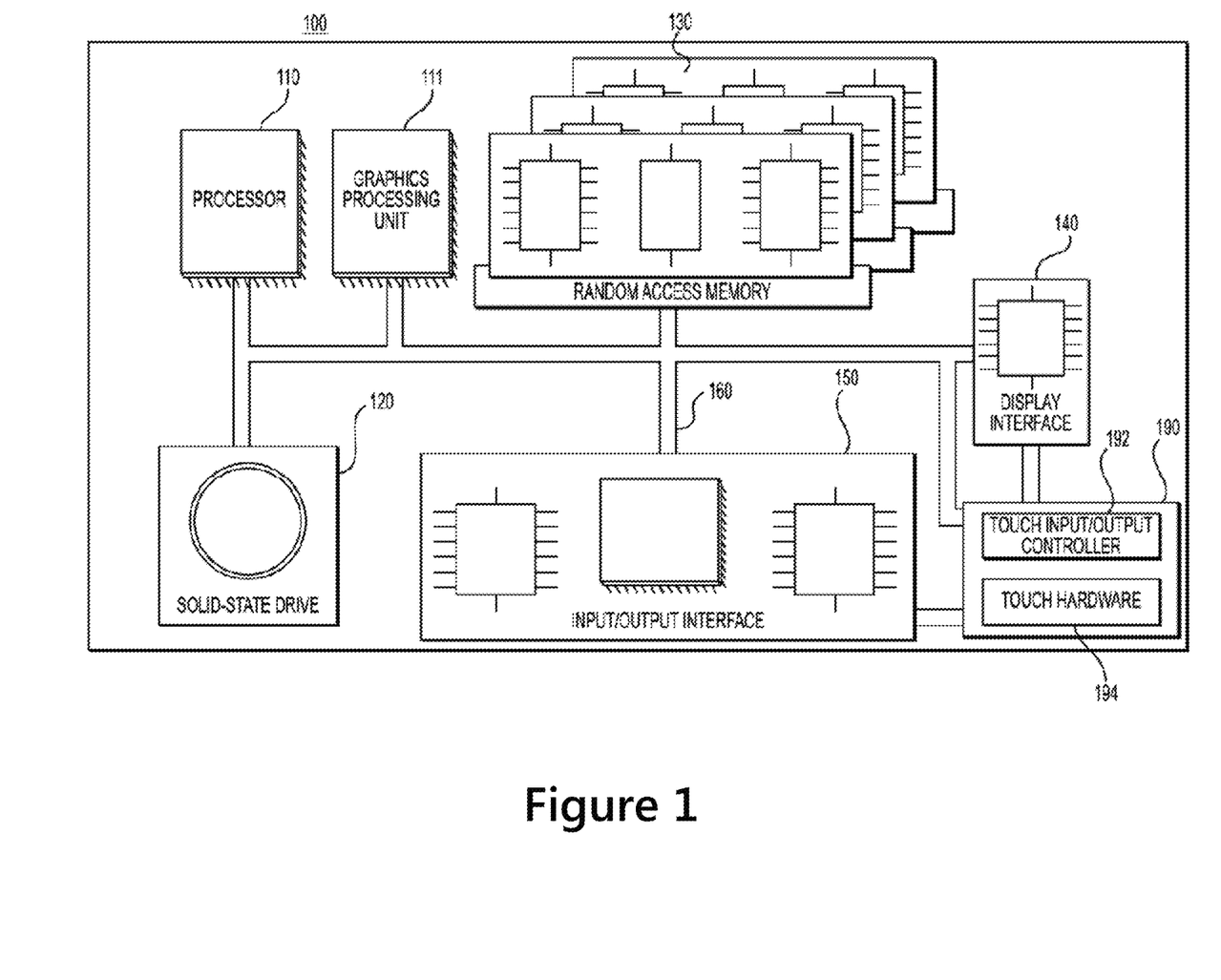
FIG. 1 is a block diagram of an example computing environment in accordance with embodiments of the present technology.

FIG. 1 illustrates a computing environment in accordance with an embodiment of the present technology, shown generally as 100. In some embodiments, the computing environment 100 may be implemented by any of a conventional personal computer, a computer dedicated to managing network resources, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of one or more conventional Central Processing Units (CPUs), one or more specialized processing cores may be provided. For example, one or more Graphic Processing Units (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Figure 2:
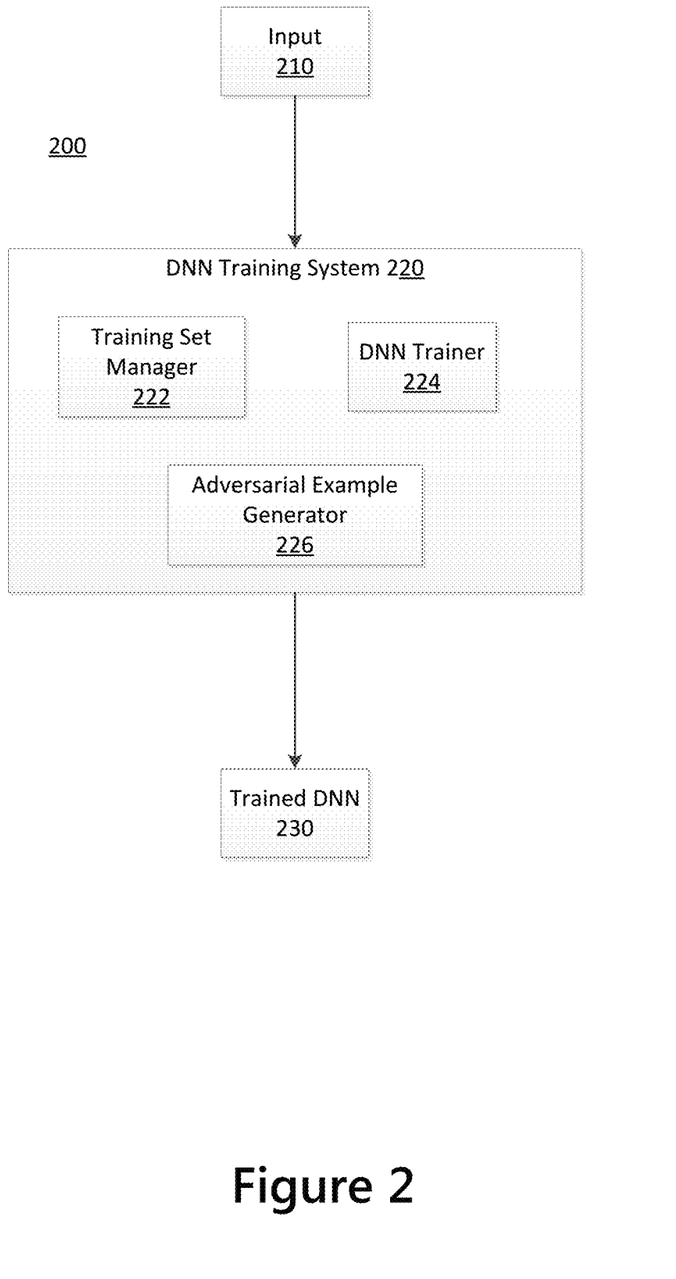
FIGS. 2 & 3 are schematic illustrations of an operating environment which may be used to generate adversarial examples in accordance with embodiments of the present technology.

FIG. 2 is a schematic illustration of an operating environment 200 which may be used to generate adversarial examples which may also be referred to as "adversarial input data" or "adversarial training data". In some embodiments, adversarial examples may be defined as inputs to a neural network which comprise one or more subliminal signals. In some embodiments, the one or more subliminal signals may take the form of low-intensity perturbations to input data (e.g., noise introduced to an image or permutations between words of a text). In some embodiments, the low-intensity perturbations to the input data may be unnoticeable to a human. In some embodiments, the term "adversarial examples" may also refer to inputs that are not maliciously crafted, but represent collections of inputs that, due to unexpected factors (e.g., lighting, background noise), cause the neural network to make incorrect predictions. Even though reference is made to the training of neural networks throughout the present disclosure, this aspect is not limitative. It should be understood that other techniques of machine learning and/or other types of machine learning algorithms (MLAs) are also envisioned without departing from the scope of the present technology.

In some embodiments, the operating environment 200 is executed on a computing environment which may be similar to the computing environment 100. This aspect is not limitative and many variations of computing environments may be envisioned without departing from the scope of the present technology. In addition to generating adversarial examples, the operating environment 200 may also be used to train a neural network based on the generated adversarial examples. In some embodiments, the trained neural network may be a deep neural network (DNN). In the illustrated embodiments, the operating environment 200 comprises a DNN training system 220. The DNN training system 220 may comprise a training set manager 222, a DNN trainer 224 and an adversarial example generator 226. The DNN training system 220 may receive input 210 and produce a trained DNN 230 based on the input 210.

In some embodiments, the input 210 may be accessed from a database of labeled training data points which are suitable to be used to train an MLA. Each labeled training data point in the database of labeled training data points may include an input and one or more labels corresponding to the input. For example if the input is a picture of a cat or a dog, and the goal of the MLA is to predict whether the image is of a cat or a dog, the label corresponding to the input would indicate whether the input is a picture of a cat or whether it is a picture of a dog. The labels may be applied by humans. In the example where the input is a picture of a cat or a dog, a human may be provided the picture and asked to select either "cat" or "dog." The labels may be otherwise determined, such as from measured data. In alternative embodiments, the input 210 may be accessed from a database of unlabeled training data points, such as in context wherein the MLA training system 220 is performing unsupervised learning.

In accordance with some embodiments, components of the DNN training system 220 may interoperate to produce the trained DNN 230. For example but without being limitative, creating the trained DNN 230 may comprise generating one or more adversarial examples to attack a deep learning algorithm used for image classification (e.g., in the context of object recognition, etc) or natural language processing (e.g., in the context of automatic translation or text generation, etc). Even though the previous examples refer to image classification or natural language processing, it should be understood that this aspect is not limitative and other field of applications may be envisioned without departing from the scope of the present technology.

As a non-limiting example, the training set manager 222 may determine a first training set based on the input 210, the DNN trainer 224 may then cause a first DNN to be trained to classify examples using the first training set. In some such examples, adversarial examples generator 226 may generate one or more adversarial examples that are misclassified by the first DNN.

In some embodiments, the one or more adversarial examples that are misclassified by the first DNN may then be provided to the training set manager 222 so as to be included in a second training set. In some non-limiting embodiments, the process of generating adversarial examples, determining an updated training set and training a DNN with the update training set may be repeated such that an iteration parameter is satisfied. For instance, the input 210 may include a numeric iteration parameter of five (5). In such instances, this may correspond to DNN training system 220 performing five iterations of generating adversarial examples, determining an updated training set and training a DNN with the updated training set. In such embodiment, the DNN trained with a training set that includes the last round of adversarial examples generated may be output as the trained DNN 230. In some alternative embodiments, the process of generating adversarial examples, determining an updated training set and training a DNN with the update training set may be repeated such that a metric associated with the DNN is met. As an example, but without being limitative, such metric may be associated with an accuracy of a classifier associated with the DNN (e.g., by measuring a loss of the DNN). In accordance with some embodiments, the DNN may output various types of output, including, but not limited to, a classification of the input 210.

Figure 3:
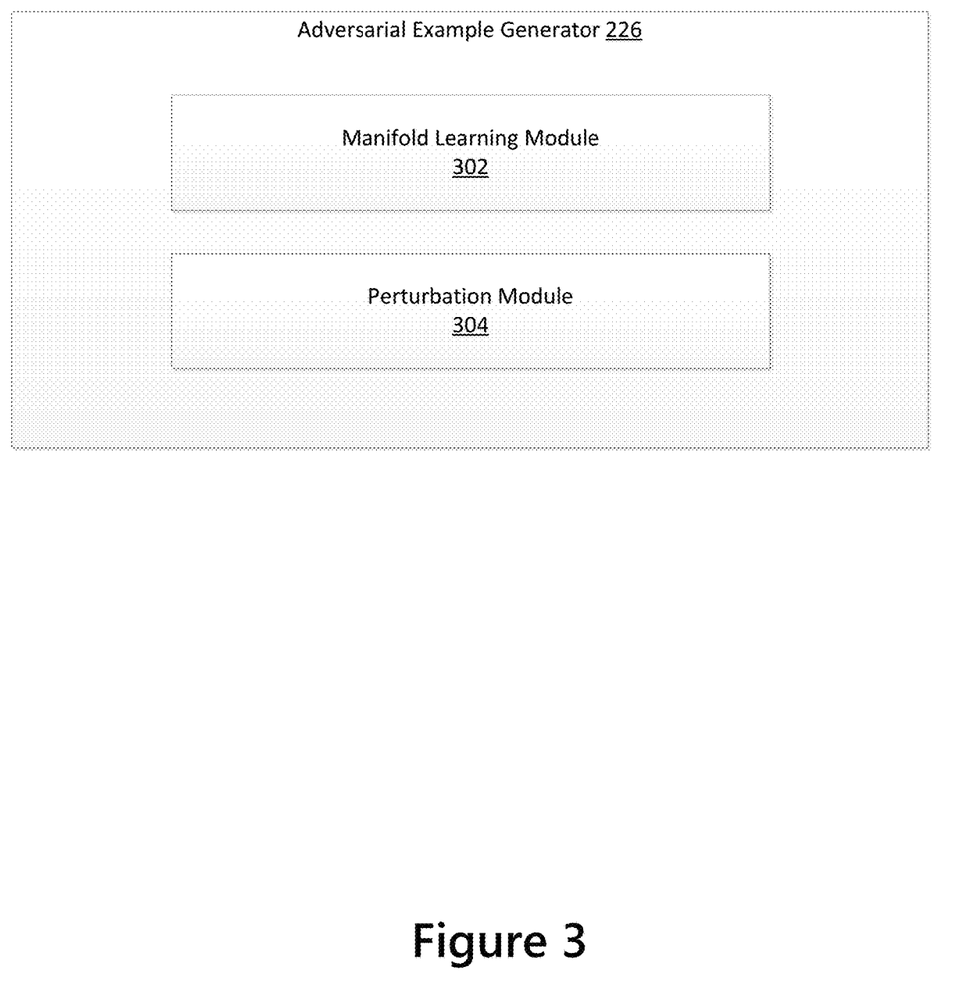

Turning now to FIG. 3, an exemplary embodiment of the adversarial example generator 226 is depicted. The adversarial generator 226 operates so as to produce coherent, i.e., semantically meaningful, adversarial examples. As a first example, coherent adversarial examples in the context of image processing, means adversarial examples that are identical to real images and preserve location of fine details of the image. As a second example, coherent adversarial examples in the context of text or language processing means adversarial examples that are grammatically and linguistically correct.

In the illustrated embodiments, the adversarial examples generator 226 comprises a manifold learning module 302 and a perturbation module 304 operated so that a first manifold associated with the input and a second manifold associated with the adversarial examples be aligned thereby allowing the adversarial examples to properly reflect semantics of the input.

Broadly speaking, the manifold learning module 302 executes a manifold learning routine implementing a variational inference method to encode high-dimensional data into a low dense representation while avoiding reparametrizing an encoder network. The perturbation module 304 executes a perturbation routine implementing the manifold invariance concept by establishing a neighborhood of the learned manifold elements which preserves the semantics associated with the inputs. Exemplary steps that may be performed by the manifold learning module 302 and the perturbation module 304 are described in connection with the below description of FIGS. 4, 5 and 9.

Exemplary Framework

Figure 4:
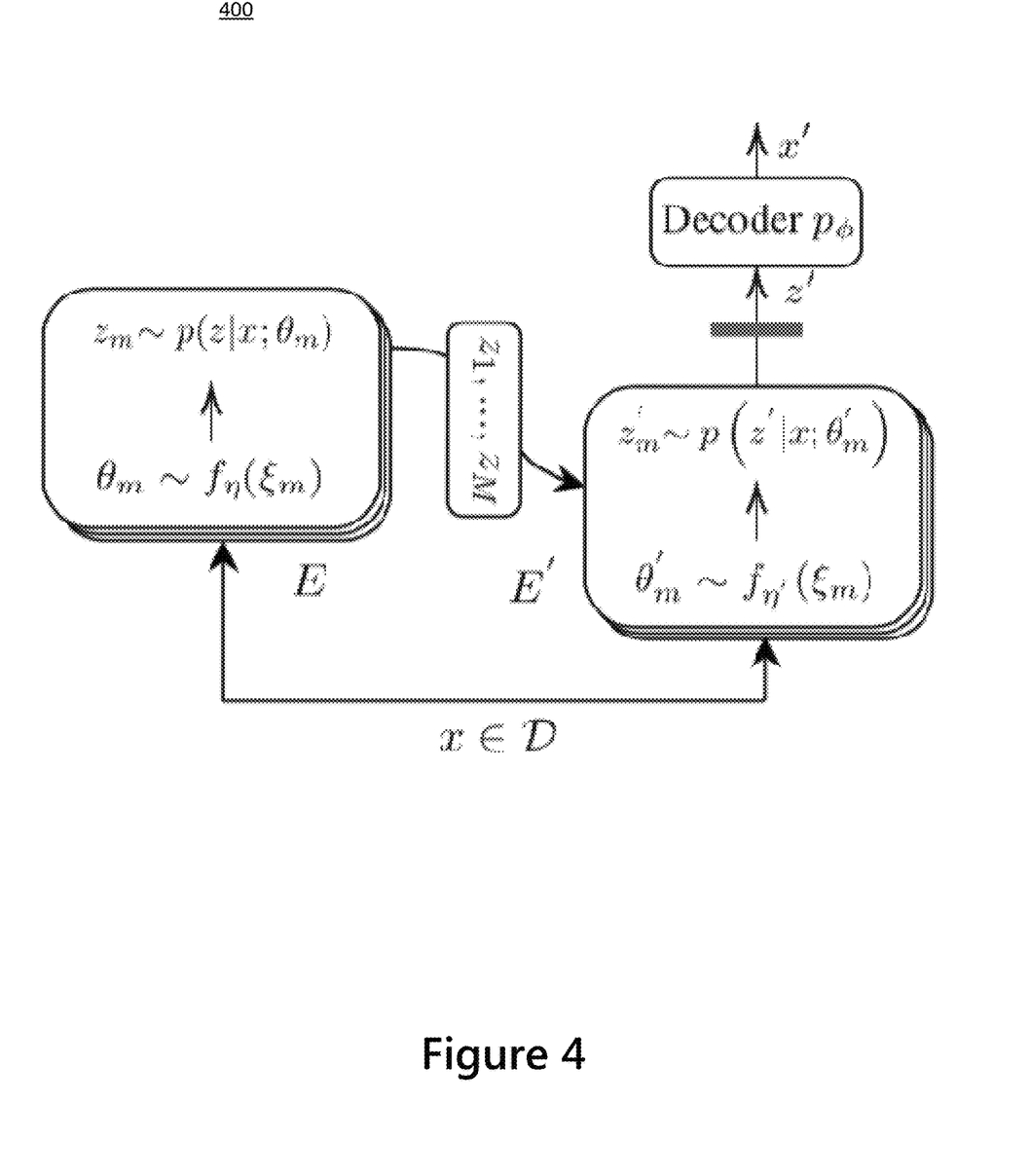
FIGS. 4 & 5 are illustrations of steps performed by a manifold learning module and a perturbation module in accordance with embodiments of the present technology.

In some embodiments, the adversarial examples generator 226 implements a framework 400 similar to the framework illustrated in FIG. 4. Instances $\theta_m$ wherein $m \in \{1, \ldots, M\}$ of an encoder E are represented. Instances $\theta_m$ define parameters of the encoder E. Similarly, instances $\theta'_m$ wherein $m \in \{1, \ldots, M\}$ of an encoder E' are represented. Instances $\theta'_m$ define parameters of the encoder E'. In some embodiments, instances $\theta_m$ are based on a recognition model which takes as input random vectors and the parametrisation $\eta$. In some embodiments, the parametrisation $\eta$ is chosen in such a way that the instance $\theta_m$ encodes inputs x into latent variables z. In some embodiments, instances $\theta'_m$ are based on a recognition model which takes as input random vectors and the parametrisation $\eta'$. A manifold M is composed of latent codes z (also equally referred to as latent representations z). In the illustrated embodiment, model instances $\theta_m$ and $\theta_m$ are generated from recognition networks $f_\eta(\xi)$ and $f_\eta'(\xi)$ where $\eta$ and $\eta'$ are the learnt parameters. Model instances $\theta_m$ and $\theta_m$ are used to sample $z_m$ and $z'_m$ given an input $x \in D$, for any $m \in \{1, \ldots, M\}$. In some embodiments, x' is generated from posterior sampling of a z' via Bayesian ensembling. In some embodiments z' may be passed to a decoder $p_\phi$ to generate x'. It should be noted that throughout this disclosure reference is made to both instances and particles. It should be understood that both terms may be used interchangeably.

In some embodiments, the framework 400 may be implemented via a variational auto-encoder (VAE). In some embodiments, the VAE comprises an encoder and a decoder. Implementation details of the encoder and of the decoder will become apparent to the person skilled in the art of the present technology. Inputs may comprise a dataset of training examples (such as the input 210) which may be represented as D. Classes associated with the dataset D may be represented as $\gamma$. A black-box classifier may be represented as g. The black-box classifier typically refers to a classifier for which parametrization is unknown, typically in the context of "black-box attacks" wherein an attacker has only access to the predictions of the classifier g and wants to construct adversarial examples not knowing the intricacies of g such as, for example but without being limitative, a loss function or a gradient. It should be noted that the present technology may also be applicable to "white-box attacks" wherein attacker may know at least some of the intricacies of a classifier g.

In some embodiments, the VAE learns to approximate variational posterior over D. Such learning may be implemented by a first inference routine and a second inference routine. The first inference routine may comprise a Stein Variational Gradient Descent (SVGD) routine to establish a topological structure of the manifold M. In some embodiments, the SVGD routine may be implemented in accordance with the technology described in Liu & Wang (see "Qiang Liu and Dilin Wang, Stein variational gradient descent: A general purpose Bayesian inference algorithm. *Neural Information Processing Systems (NIPS)*, 2016"). The second inference routine may comprise a Gram-Schmidt basis sign routine which implementation details will become apparent to the person skilled in the art of the present technology. The learning allows to draw instances of model parameters from the implicit distributions p(θ) and p(θ) based on which the two encoders E and E' are parameterized. In such embodiments, the two encoders E and E' optimize uncertainty inherent to embedding D while easing sampling via Bayesian ensembling.

Figure 5:
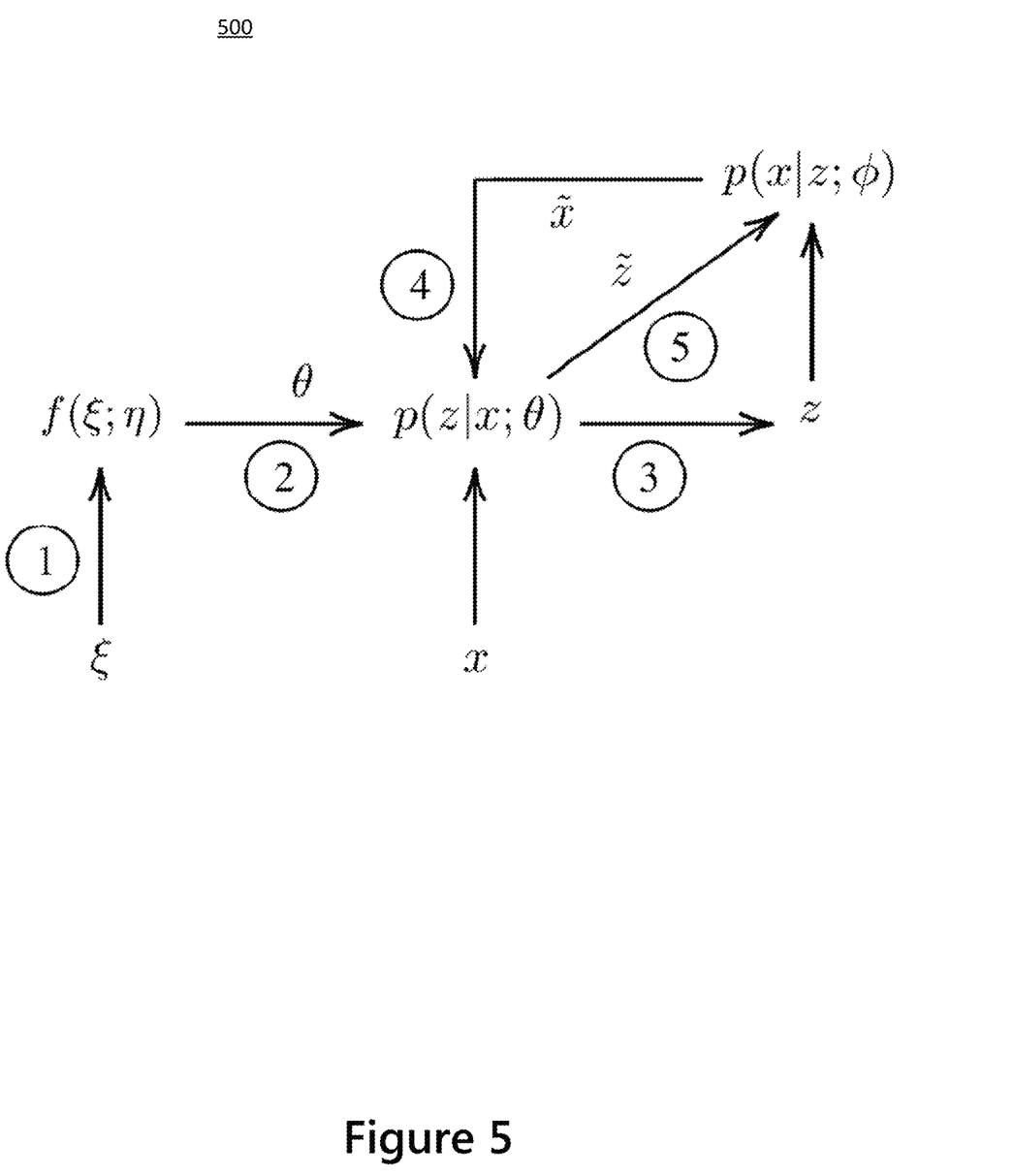

In some embodiments, the decoder $p_\phi$ acts as a generative model for generating adversarial examples and as a proxy for creating latent targets in the Z space in order to optimize the encoder E. To do so, the decoder $p_\phi$ may implement an inversion routine 500, such as depicted at FIG. 5. During an inner update, the inversion routine 500, a Gaussian noise ξ is fed to $f_\eta$ generate θ. Given x∈D, a sampling of z~p(z|x;θ) is conducted to reconstruct x̃. Then, using x̃ a sampling of z̃~p(z|x̃;θ) is conducted. At this step, z̃ becomes the target of z. At the next update, z̃ becomes the prediction and the process is repeated to create a target for z̃. In some embodiments, the inversion routine 500 may be implemented in accordance with the following algorithm:

---
Algorithm 1 Inversion with one particle θ.

---
Require: Input x ∈ D
Require: Network η
  1: Sample ξ ~ N (O, I)
  2: Sample θ ~ $f_\eta$ (ξ)
  3: Given x, sample z ~ p(z|x: θ)
  4: Sample x̃~ p(x|z, ø)
  5: Sample z̃ ~ p(z|x̃, θ)
  6: Use x and z̃ to compute p(z̃|x; θ)

---

In accordance with the framework 400, the adversarial examples are not found for a given input x in the input space D as it may be the case with existing approaches. Rather, the framework 400 learns to perturb the latent code z in a way that the perturbed version of the latent code z' and the non-pertubed version of the latent code z lie in a same manifold M. As previously explained, x' is then constructed by using the decoder $p_\phi$. In other words, the framework 400 may be said to efficiently perturb the latent codes and then map the two-dimensional representations back onto the input space. Such approach allows better control of perturbations injected to the adversarial examples thereby ensuring that they are more likely to be similar to the inputs.

Implicit Manifold Learning

An exemplary embodiment of a manifold learning routine which may be implemented by the manifold learning module 302 will be further discussed in the paragraph below. Uncovering structure in high dimensional data D and understanding its meta-properties may be achieved by mapping D to a low dimensional subspace in which explanatory hidden features may become apparent. Assumption is made that data of interests lie on or near lower dimensional manifolds on its embedding space. To implement the VAE, datapoints $x_n \in D$ are modeled via a decoder $x_n|z_n \sim p_\phi(x_n|z_n)$ with a prior p(z) placed on the latent codes $z_n$. To learn parameters ϕ of the decoder, an approach may consist of maximizing a variational approximation of an empirical expected log-likelihood which may be called evidence lower bound (ELBO) and represented by the following mathematical representation:

$$\mathcal{L}_e(o, \psi, x) = \mathbb{E}_{z|x;\psi} \log\left[\frac{p(x|z;\phi)p(z)}{q(z|x;\psi)}\right] = -\mathbb{KL}(q(z|x;\psi)\|p(z|x;\phi)) + \log p(x;\phi).$$

Expectations $\mathbb{E}_{z|x;\psi}$ can be expressed as a sum of a reconstruction loss, or expected negative log-likelihood of x, and a $\mathbb{KL}$ (q(z|x;ψ)∥p(z)). The $\mathbb{KL}$ term acts as a regularizer and forces the encoder q(z|x;ψ) to follow a distribution similar to p(z). To avoid limitations of prior art approaches imposing a Gaussian form on p(z), the present technology applies a Stein Variational Gradient Descent (SVGD) routine to learn the manifold, instead of explicitly optimizing the ELBO.

Stein Variational Gradient Descent (SVGD) Routine

An exemplary embodiment of a SVGD routine which may be implemented as part of the manifold learning module 302 will be further discussed in the paragraph below. The SVGD routine may be implemented as a nonparametric variational inference method which does not confine a target distribution p(z). In some embodiments, to approximate p(z), SVGD maintains M particles $z=\{z_m\}_{m=1}^M$, which may be initially sampled from a simple distribution, and which may be iteratively transported via a functional gradient descent. At iteration t, each particle $z_t \in z_t$ may be updated as follows:

$$z_{t+1} \leftarrow z_t + \alpha_t \tau(z_t) \text{ where}$$

$$\tau(z_t) = \frac{1}{M}\sum_{j=1}^M \left[k(z_t^j, z_t)\nabla_{z_t^j} \log p(z_t^j) + \nabla_{z_t^j} k(z_t^j, z_t)\right]$$

Where $\alpha_t$ is a step-size and k(.,.) is a positive-definite kernel.

In the above equation, each particle determines its update direction by consulting with other particles and asking their gradients. An importance of a latter particles may be weighted according to a distance measure k(.,.). Closer particles are given higher consideration than those lying further away. A term $\nabla_z k(z^j, z)$ is a regularizer that acts as a repulsive force between the particles to prevent them from collapsing into one particle. Upon convergence, the particles $z_m$, will be unbiased samples of the true implicit distribution p(z).

Manifold Learning Via SVGD

An exemplary embodiment of a characterisation of a manifold M based on an SVGD routine which may be implemented as part of the manifold learning module 302 will be further discussed in the paragraph below. In some embodiments, faithfully characterizing the manifold M of D may involve optimizing a divergence $\mathbb{KL}$ (q(z|x;ψ)∥p(z|x;ϕ)) using the SVGD routine. In order to improve efficiently as to how M is learnt, a Bayesian method is used as it provides a principled way to model uncertainty through posterior distribution over model parameters. In this regard, M instances of model parameters $\Theta = \{\theta_m\}_{m=1}^M$ are introduced where every $\theta_m \in \Theta$ is a particle that defines the weights and biases of a Bayesian neural network. The SVGD routine is applied on the particles $\Theta$. In some embodiments, the SVGD routine may maintain M particles. In some embodiments, to limit drawbacks such as computational expenses for large M, only one recognition network $f_\eta$ that takes as input $\xi_m \sim \mathcal{N}(0,I)$ and outputs $\theta_m$ is maintained. To obtain $f_\eta$, η is updated through a small number of gradient steps. If $\eta_t$ parameterizes f at iteration t, then $\eta^{t+1}$ is obtained by: S $$\eta^{t+1} \leftarrow \operatorname*{argmin}_{\eta} \sum_{m=1}^{M} \left\| \underline{f(\xi_m; \eta^t) - \theta_m^{t+1}} \atop \theta_m^t \right\|_2 \text{ with } \theta_m^{t+1} \leftarrow \theta_m^t + \alpha_t \tau(\theta_m^t) \text{ where}$$

$$\tau(\theta^t) = \frac{1}{M} \sum_{i=1}^{M} \left[ k(\theta_j^t, \theta^t) \nabla_{\theta_t^j} \log p(\theta_j^t) + \nabla_{\theta_t^j} k(\theta_j^t, \theta^t) \right].$$

In some embodiments, $SVGD_\tau(\Theta)$ may be used to denote an SVGD update of $\Theta$ using the operator τ(•). As the particles $\Theta$ are Bayesian, upon observing D, a prior $p(\theta_j^t)$ may be updated to obtain a posterior $p(\theta_j^t|\mathcal{D}) \propto p(\mathcal{D}|\theta_j^t) p(\theta_j^t)$ which captures the uncertainty. The data likelihood $p(\mathcal{D}|\theta_j^t)$ evaluated over all pairs (x,z̃) where $x \in \mathcal{D}$ and z̃ is a dependent variable. In accordance with embodiments of the present technology, z̃ is generated using an algorithm implementing:

$$p(\mathcal{D} | \theta_j^t) = \prod_{(x,\tilde{z})} p(\tilde{z} | x; \theta_j^t) \text{ where } x \in \mathcal{D}$$

In some embodiments, for any input $x \in D$ the corresponding latent code z is sampled from $p(z|z;\mathcal{D})$ which may be approximated by calculating a Monte Carlo over $\Theta$ approximation. In some embodiments, $p(z|x;\mathcal{D})$ may be represented by the following equation:

$$p(z | x; \mathcal{D}) = \int p(z | x; \theta) p(\theta | \mathcal{D}) dz \approx \sum_{m=1}^{M} p(z | x; \theta_m) \text{ where } \theta_m \sim p(\theta | \mathcal{D})$$

Manifold Preserving Adversarial Attacks

Referring back to FIG. 3, this section will now describe how, in accordance with embodiments of the present technology, the manifold learning module 302 and the perturbation module 304 may interact as a unified learning procedure to generate adversarial examples.

As previously discussed, the adversarial examples generators 226 aims at perturbing elements M so that the perturbed elements reside in M and exhibit the semantics of D captured by M. In other words, a linear mapping h': $\mathcal{M} \to \mathcal{M}$ is sought so that M may be said to be preserved under h'. In order to achieve this, and rather than directly finding a linear span h', a new set of instances of model parameters $\Theta' = \{\theta_m'\}_{m=1}^M$ is introduced. Each $\theta_m'$ denotes the weights and biases of a Bayesian neural network. Then, for any inputs $x \in D$ and its latent code $z \sim p(z|x;\mathcal{D})$ a point in M, h'(z)=z' is set. z' is sampled from $p(z'|x;\mathcal{D})$ and is approximated by a Monte Carlo approximation using $\Theta'$. In some embodiments, a local smoothness of M is leveraged in a way to encourage z' to reside in M in a close neighborhood of z using a Gram-Schmidt Basis Sign Method (GBSM) routine.

Gram-Schmidt Basis Sign Method (GBSM) Routine

This section will now describe an exemplary embodiment of a GBSM routine. Assuming X being a minibatch of samples of D and $Z_m$ a set of latent codes $z_m \sim p(z|x;\theta_m)$ where $x \in X$ and $\theta_m \in \theta$. For any $m \in \{1, \ldots, M\} \theta_m'$ is learnt to generate perturbed versions of $z_m \in Z_m$ along directions of an orthogonal basis $U_m$. As M is locally Euclidean, dimensions of the subspace $Z_m$ are computed by applying Gram-Schmidt to orthogonalize a span of representative local points. This step may formalized as an optimisation routine which, once executed, allows learning of perturbations $\delta_m$, directions sign $(U_m)$ along which to perturb $Z_m$ and $\theta_m'$ in accordance with the following equation:

$$\operatorname*{argmin}_{\delta_m, \theta_m'} \varrho(\delta_m, \theta_m') := \sum_{z_m} \| z_m' - [z_m + \delta_m \odot \operatorname{sign}(u_{im})] \|_2 \text{ where}$$

$$z_m' \sim p(z' | x_i; \theta_m')$$

In some embodiments, the GBSM routine is relying upon the fact that topological spaces are closed under their basis vectors to render M invariant to the perturbations $\delta_m$. The following steps are an example of how the GBSM routine may be executed. First, sampling a model instance $\theta_m'$. Then, generating $z_m' \sim p(z'|x;\theta_m')$ for all $x \in X$. $Z_m$ is then orthogonalized and a noise tensor $\delta_m$ minimizing $\varrho$ along directions of the basis vector $u_{im} \in U_m$ is found. The perturbations $\delta_m$ are constrained to be small. With $\delta_m$ fixed, $\theta_m'$ is updated by minimizing $\varrho$ again. The notation GBSM($\Theta'$, $\Delta$) where $\Delta = [\delta_1, \ldots, \delta_M]^\tau$ is used to denote one update of $\Theta'$ via the GBSM routine.

Manifold Alignment

This section will now describe an exemplary embodiment of a manifold alignment routine. Even though the GBSM routine may confer latent noise imperceptibility and sampling speed, $\Theta'$ may deviate from $\Theta$ in which case the learnt manifolds may be misaligned. To mitigate this, a manifold alignment routine may be applied by regularizing each $\theta_m' \in \Theta'$ after every GBSM update. In some embodiments, an SVGD update on $\Theta'$ may be applied to ensure that $\Theta'$ follow transform maps constructed by $\Theta$ in accordance with the following equation:

$$\theta_{t+1}' \leftarrow \theta_t' + \alpha_t \pi(\theta_t') \text{ where}$$

$$\pi(\theta_t') = \frac{1}{M} \sum_{j=1}^{M} \left[ k(\theta_t', \theta_t^j) \nabla_{\theta_t^j} \log p(\theta_t^j) + \nabla_{\theta_t^j} k(\theta_t', \theta_t^j) \right]$$

A notation $SVGD_\pi(\Theta')$ may used to denote one application of the gradient update rule of the equation above. During such update, the model instances $\Theta'$ determine their own update direction by consulting the particles $\Theta$ alone instead of consulting each other. Maintaining $\Theta'$ for large M being potentially computationally prohibitive, only one recognition network $f_{\eta'}$ may be maintained that takes as input $\xi_m' \sim \mathcal{N}(0,I)$ and generates $\theta_m' \sim f(\xi_m';\eta')$ In some embodiments, η' is updated through a small number of gradient steps to obtain good generalization performances, in accordance with the following equation:

$$\eta^{n+1} \leftarrow \underset{\eta'}{\operatorname{argmin}} \sum_{m=1}^{M} \left\| \underbrace{f(\xi'_m; \eta'^t) - \theta'^{t+1}_m}_{\theta'^t_m} \right\|_2 \text{ where } \theta'^{t+1}_m \leftarrow \theta'^t_m + \alpha_t \pi(\theta'^t_m)$$

Generating Adversarial Attacks

Amongst other benefits, the present technology allows generating adversarial examples in the context of a "black-box scenario" in which only predictions of a classifier g are accessible (as opposed to being able to access parametrization of the classifier g). Amongst yet other benefits, the present technology allows generating adversarial examples in the context of a "white-box scenario" in which parametrization of a classifier g is known. In some embodiments, adversarial examples are generated by optimizing a loss, in accordance with the following equation:

$$\mathcal{L} = \|x - x'\|_2 + \min_{y' \in y} [\mathbb{1}_{y=y'} \cdot \log(1 - P(y' \mid x'))] \text{ such that } \|x - x'\|_2 \leq \epsilon_{attack}$$

In accordance with the above equation, the first term is a reconstruction loss which may account for a dissimilarity between any input x∈D and its adversarial counterpart x'. In some embodiments, the first term may be constrained to be smaller than $\epsilon_{attack}$ so that x' resides within an $\epsilon_{attack}$-radius ball of x. The second term is a log-likelihood loss of a target class y'∈y\{y} where y is the class of x. The loss defines the cost incurred for failing to fool the classifier g.

In accordance with some embodiments of the present technology, an end-to-end adversarial examples generation procedure may be summarized as follows.

In accordance with the above end-to-end adversarial examples generation procedure, at steps 1-5, vectors and η, η and φ learnt by a model. At step 6, M random variables $\xi_m$ are samples. In other words, ξ={$\xi_1$, ..., $\xi_m$}. At steps 7-9, θ and θ' are generated. Θ={$\theta_1$, ..., $\theta_m$} where θ=$f_\eta$(ξ) and Θ'={$\theta'_1$, ..., $\theta'_m$} where θ'=$f_{\eta'}$(ξ). Particles $\theta_m$ and $\theta'_m$ are generated from recognition networks $f_\eta$(ξ) and $f_{\eta'}$(ξ) where η and η' are learnt parameters. In some embodiments, particles $\theta_m$ and model instances $\theta'_m$ are encoder parameters of E and E'.

At step 10, latent variables z and z' are sampled from the encoder. Latent variables z and z' are encoded representation of an input x. Latent variables z and z' may be approximated as z~p(z|x;θ)=$g_\theta$(x) (e.g., the encoder E) and z'~p(z|x;θ')=$g_{\theta'}$(x) (e.g., the encoder E'). Input x and perturbed variable x' are reconstructed from the decoder and may be approximated as x~p(z|x;φ)=$g_\phi$(z) and x'~p(z|x;φ')=$g_{\phi'}$(z').

In some embodiments, an inner training is performed wherein x=input (e.g., a portrait), z=$g_\theta$(x) (the input is encoded into a latent representation z), x̂=$g_\phi$(z) (the input is decoded/reconstructed) and ẑ=$g_\theta$(x̂) (the target x̂ is re-encoded into a latent representation ẑ). x̂ and ẑ may be deemed targets of x and z respectively. If $g_\theta$( ) and $g_\phi$( ) are properly trained, x (x̂) and z (ẑ) should be similar.

In accordance with some embodiments of the present technology, the InnerTraining function called at step 12 may comprise (1) updating η with SVGD (θ') (i.e., the manifold learning set forth at step 2 above), (2) distorting the latent codes with GBSM (i.e., the manifold perturbation/distortion set forth at step 3 above), (3) updating η' with SVGD (θ') (i.e., the manifold alignment set forth at step 4 above).

At steps 13 and 14, the loss functions $L_{\hat{x}}$ and $L_{x'}$ are computed. In some embodiments, $L_{\hat{x}}$ is a function quantifying how x̂ and are similar and $L_{x'}$ is a function quantifying how x and x' are similar. For trained model, i.e., when $L_{\hat{x}}$ and $L_{x'}$ are in a local minimum, then x̂, x' and x lie in a same manifold and x' is an adversarial example of x.

---

Algorithm 2 Generating Adversarial Examples. Lines 2 and 4 compute distances between sets keeping a one-to-one mapping between them. x' is adversarial to x when $\mathcal{L}_{x'} \leq \epsilon_{attack}$ and y ≠ y'.

```
 1: function INNERTRAINING(Θ, Θ', η, η', Δ, x̃)         local gradient updates of f_η, f_η', Δ
Require: Learning rates β, β'
 2:    η ← η - β∇_η ||Θ - SVGD_π(Θ)||_2                apply inversion on x̃ and update η
 3:    Δ, Θ' ← GBSM(Θ', Δ)                             update Δ and Θ' using GBSM
 4:    η' ← η' - β'Δ∇_η' ||Θ' - SVGV_π(Θ')||_2         align Θ' with Θ and update η'
 5:    return η, η', Δ
Require: Training sample (x, y) ∈ 𝒟 × y
Require: Number of model instances M
Require: Number of inner updates T
Require: Initialize weights η, η', φ                   recognition nets f_η, f_η', decoder p_φ
Require: Initialize perturbations Δ := [δ_1, ..., δ_M]^T   latent (adversarial) perturbations
Require: Learning rates ε, α, α', and strength ε_attack
 6:    Sample ξ_1, ..., ξ_M from N(0, I)               inputs to recognition nets f_η, f_η'
 7:    for t = 1 to T do
 8:        Sample Θ = {θ_m}_{m=1}^M where θ_m~f_η(ξ_m)
 9:        Sample Θ' = (θ_m')_{m=1}^M where θ_m'~f_η'(ξ_m)
10:        Use Θ and Θ' in Equation 3 to sample z and z'
11:        Sample x̃ ~ p(x|z, φ) and x' ~ p(x'|z', φ)   clean and perturbed reconstructions
12:        η, η', Δ ← InnerTraining(Θ, Θ', η, η', Δ, x̃)
13:        𝓛_x̃ := ||x - x̃||_2 ; 𝓛_x̃ := ||x - x'||_2   reconstruction losses on x̃ and x'

14:
       𝓛_x' := ⎧ 𝓛_x',                                         if 𝓛_x' > ε_attack
              ⎨
              ⎩ 𝓛_x' + min_{y'∈y}[1_{y'=y} · log(1 - P(y'|x'))],  otherwise 15:    η ← η - α∇_η 𝓛_x̃ ; η' ← η' - α'∇_η 𝓛_x'        SGD update using Adam optimizer
16:    φ ← φ - ε∇_φ(𝓛_x̃ + 𝓛_x')                       SGD update using Adam optimizer
```

At steps 12 and 14, if $L_x > \epsilon_{attack}$, the learnt parameters may be updated to fool a classifier otherwise the learnt parameters may be updated to reinforce the classifier. Depending on $L_x$ and $\epsilon_{attack}$, the model is trained to either fool or reinforce a classifier (decoder), for example, but without being limitative, in the context of generative adversarial networks (GAN).

Examples of Manifold Preservation

Figure 6:
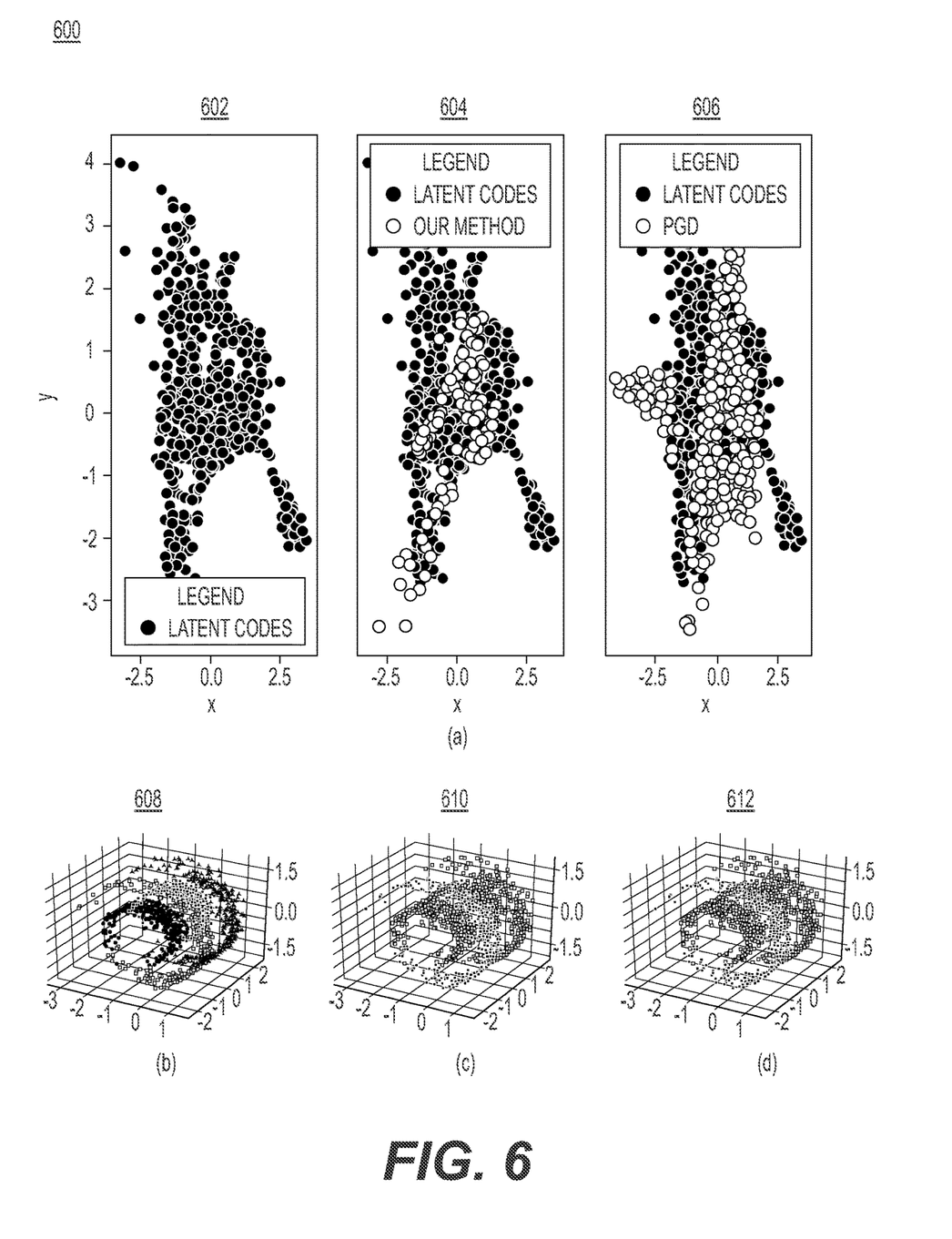
FIG. 6-8 are illustrations of examples of experiments based on embodiments of the present technology.

Referring now to FIG. 6, examples 600 of an experiment based on the present technology is illustrated. The experiment is based on a 3D non-linear Swiss Roll dataset which comprises 1,600 data points grouped in 4 classes. Graph 602 illustrates 2D plots of a manifold learnt after execution of the manifold learning module 302. The manifold comprises learned manifold elements also referred to as latent codes. Graph 604 illustrates 2D plots of perturbed learned manifold elements generated by the perturbation module 304. As it may be appreciated, the perturbed learned manifold elements have been generated so as to espouse the Swiss Role manifold. To the contrary, graph 606 illustrates 2D plots of perturbed learned manifold elements generated in accordance with prior approaches, in this example the projected gradient descent (PGD) approach. As it may be appreciated, the perturbed learned manifold elements generated with the PGD approach do not properly espouse the Swiss Role manifold. Graph 608 illustrates a 3D plot of the dataset represented in graph 602. Graph 610 illustrates a 3D plot of the dataset represented in graph 604. Graph 612 illustrates a 3D plot of the dataset represented in graph 606.

Figure 7:
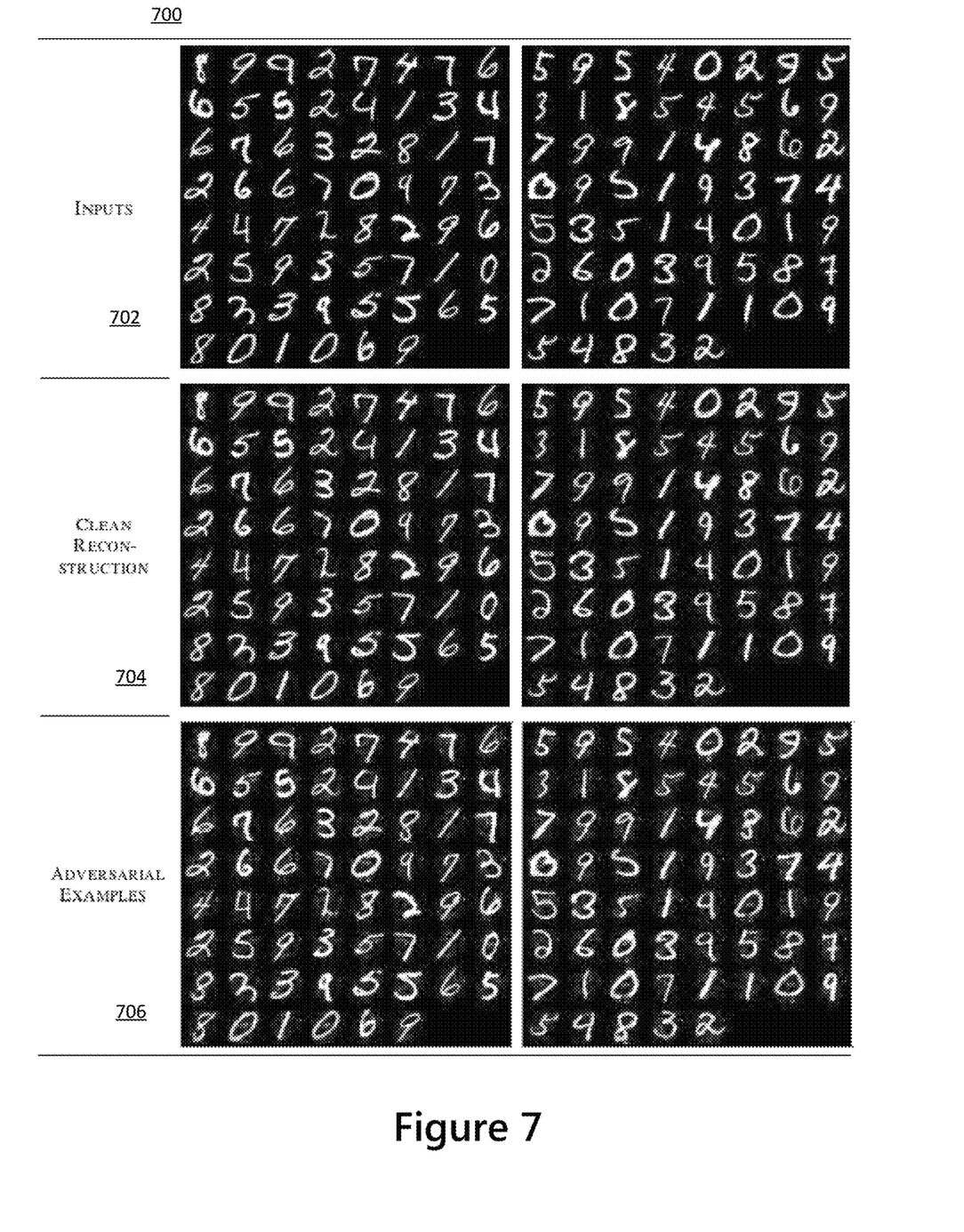

Referring to FIG. 7, an experiment 700 relating to generating adversarial examples in the context of image processing based on the present technology are illustrated. Inputs 702 are illustrated along with clean reconstruction 704. Adversarial examples 706 generated in accordance with the present technology are also illustrated.

Figure 8:
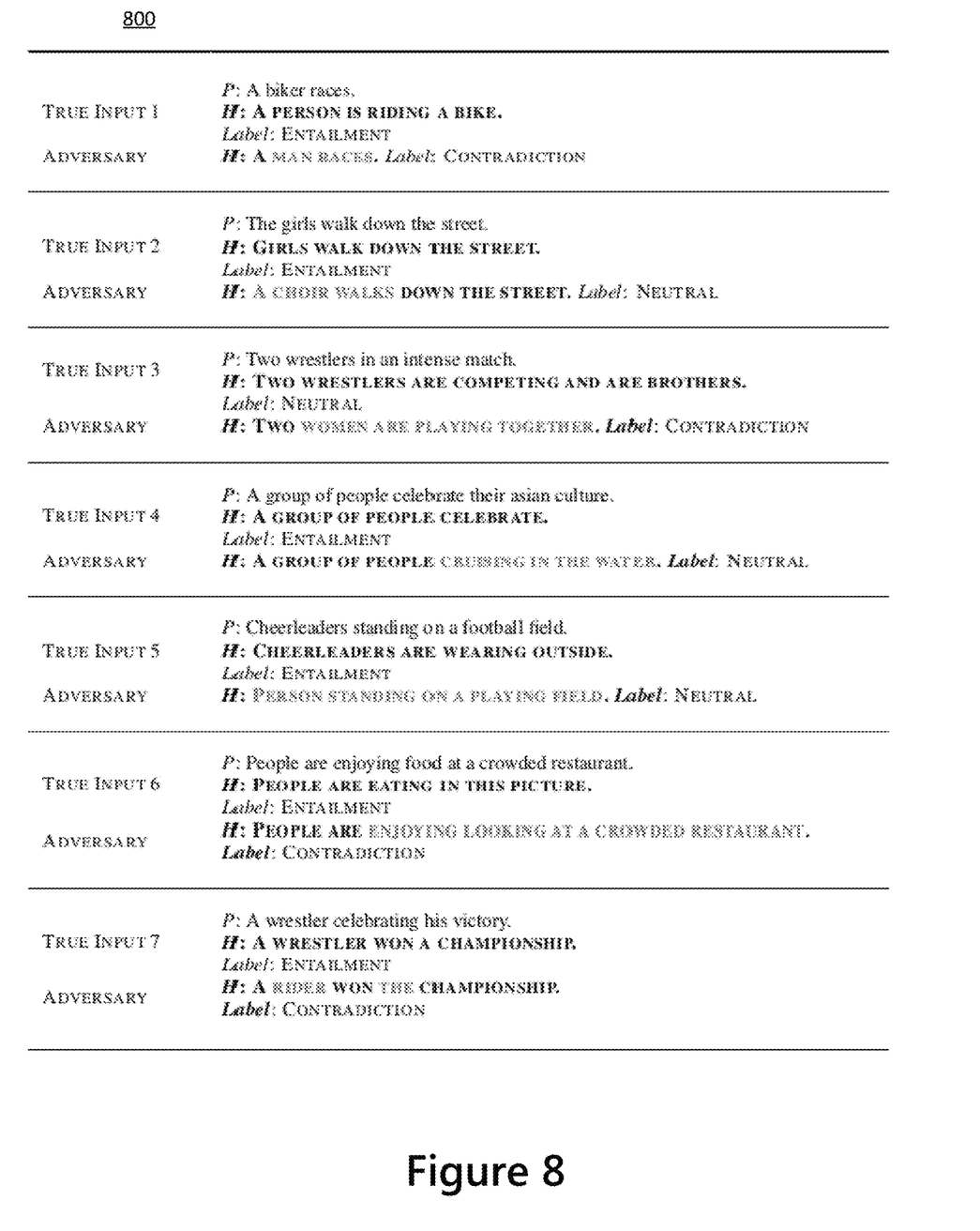

Referring to FIG. 8, an experiment 800 relating to generating adversarial examples in the context of language processing based on the present technology are illustrated. True inputs 1-7 are illustrated along with corresponding adversarial examples generated in accordance with the present technology.

Method for Generating Adversarial Examples

Figure 9:
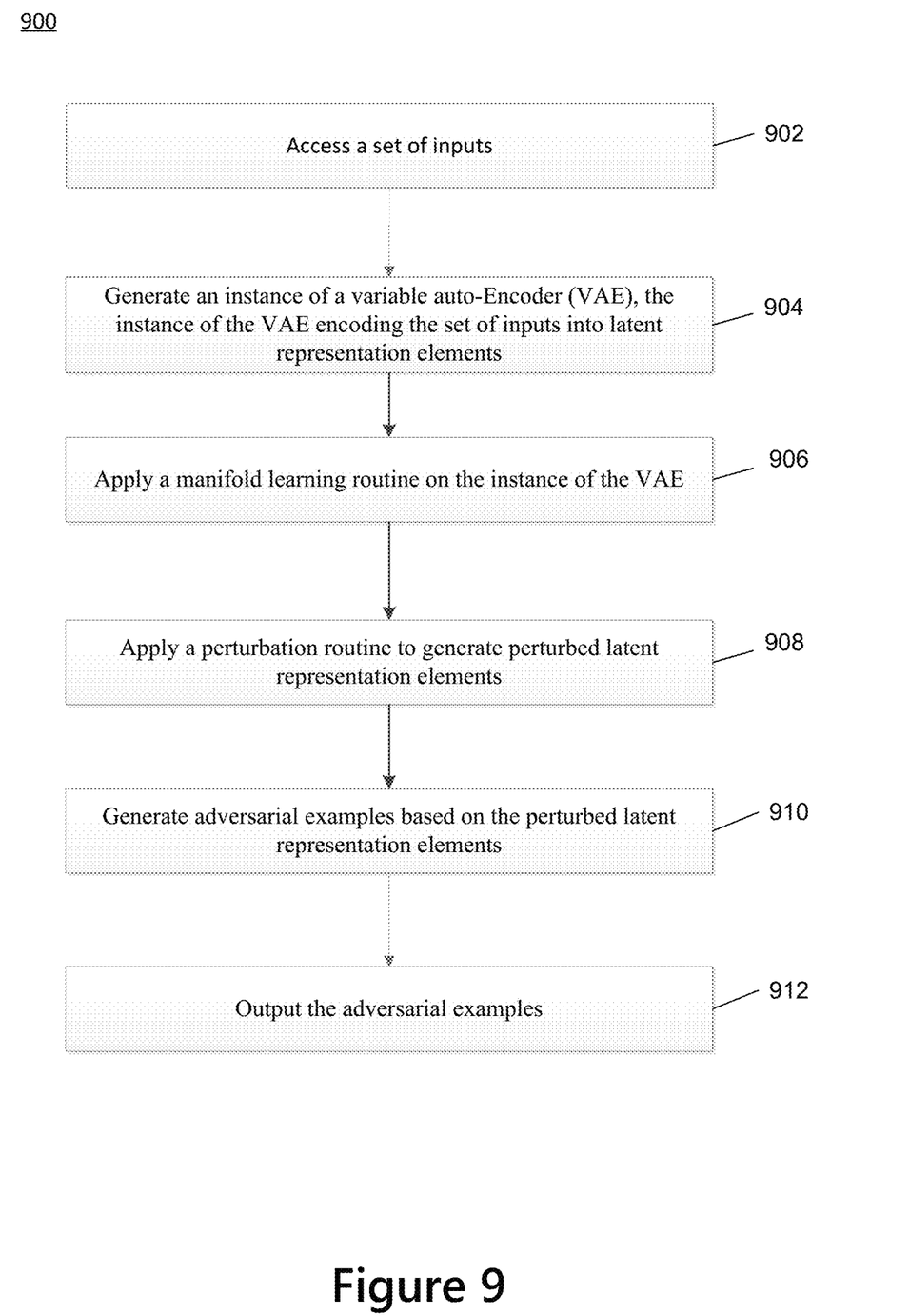
FIG. 9 is a schematic illustration of a computer-implemented method used in connection with generating adversarial examples in accordance with embodiments of the present technology.

Referring now to FIG. 9, some non-limiting example instances of systems and computer-implemented methods used in connection with generating adversarial examples to be used for training of a MLA, such as, but without being limited to, for training of a DNN. More specifically, FIG. 9 shows flowcharts illustrating a computer-implemented method 900 implementing embodiments of the present technology. The computer-implemented method of FIG. 9 may comprise a computer-implemented method executable by a processor of a computing environment, such as the computing environment 100 of FIG. 1, the method comprising a series of steps to be carried out by the computing environment.

Certain aspects of FIG. 9 may have been previously described with references to FIG. 2-6. The reader is directed to that disclosure for additional details.

The method 900 starts at step 902 by accessing a set of inputs. As previously discussed, the set of inputs may define a set of training data to be used for the training of an MLA, such as, for example, the input 210 illustrated at FIG. 2.

Then, at step 904, the method 900 executes generating an instance of a variable auto-encoder (VAE). In some embodiments, the VAE comprises an encoder and a decoder. In some embodiments, the encoder and the decoder are each associated with weights and biases. In some embodiments, the VAE comprises a first encoder, such as the encoder E depicted at FIG. 4, and a second encoder, such as the encoder E' also depicted at FIG. 4. In some embodiments, the instance of the VAE is based on a recognition model for which parameters are learnt in such a way that the instance encodes the set of inputs into latent representation elements associated with a latent space. The latent representation elements represent low geometric summaries establishing semantics associated with the set of inputs. A representation of an exemplary latent space along with low geometric summaries is depicted at FIG. 6.

At step 906, the method 900 executes applying a manifold learning routine on the instance of the auto-encoder to establish a characterization of a manifold in the latent space, the manifold being defined by the latent representation elements. In some embodiments, the manifold learning routine comprises a variational inference routine executing learning of the manifold while minimizing assumptions about a distribution of the latent representation elements. In some embodiments, the manifold learning routine comprises a Stein Variational Gradient Descent (SVGD) routine to learn the manifold. In some embodiments, the SVGD routine generates the particles that parametrize the encoder E wherein E is understood as composed of m encoders where each encoder m is parametrized by $\theta_m$. The manifold M is defined by latent codes generated using the particles $\theta$. Exemplary embodiments of the manifold learning routine and of the SVGD routine are provided in the above description of FIG. 3-6. In some embodiments, generating adversarial examples is performed by the decoder and comprises operating an inversion routine to reconstruct the adversarial examples from the perturbed latent representation elements. Exemplary embodiments of the inversion routine are provided in the connection with the above description of FIG. 4.

At step 908, the method 900 executes applying a perturbation routine to generate perturbed latent representation elements while constraining the perturbed latent representation elements to remain within the manifold. In some embodiments, the perturbation routine comprises establishing a neighborhood of the latent representation elements which preserves semantics associated with the set of inputs. In some embodiments, the neighborhood is a uniformly-bounded ball associated with a radius ($\epsilon_{attack}$). In some embodiments, the perturbation routine comprises generating perturbed instances of the encoder that define perturbed weights and biases of a perturbed neural network, the perturbed instances defining a perturbed manifold.

In some embodiments, constraining the perturbed latent representation elements to remain within the manifold comprises applying a Gram-Schmidt Basis Sign Method (GBSM) routine. In some embodiments, constraining the perturbed latent representation elements to remain within the manifold further comprises applying a manifold alignment routine. In some embodiments, the manifold alignment routine comprises regularizing each perturbed instances of the encoder after each update of the GBSM. Exemplary embodiments of the GBSM routine and of the manifold alignment routine are provided in the above description of FIG. 3-6.

Then, at step 910, the method 900 executes generating adversarial examples based on the perturbed latent representation elements, the adversarial examples sharing a common semantics associated the set of inputs.

In some embodiments, generating adversarial examples also comprises optimizing a loss. In some embodiments, optimizing the loss comprises bounding the loss by a radius ($\varepsilon_{attack}$) as previously detailed in connection with the description of FIG. 3-6.

At step 912, the method 900 proceeds to outputting the adversarial examples which may be used, for example, but without being limitative, as part of a training routine of a DNN. In some embodiments, the adversarial examples are generated so as to fool a classifier associated with a neural network, for example, but without being limitative, in the context of a "black-box attack" scenario of a classifier which associated parameters are unknown and/or in the context of a "white-box attack" scenario of a classifier which associated parameters are known. In some other embodiments, the adversarial examples may be used for reinforcement of a classier (i.e., by augmenting the set of training inputs with the generated adversarial examples). In some embodiments, the steps 906 and 908 are executed as a unified routine, in other words, steps 906 and 908 may be executed in parallel and not in series.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof. As used herein, the wording "at least one of X or Y" or "at least one of X and Y" is intended to represent an inclusive-or; for example, "at least one of X or Y" or "at least one of X and Y" are intended to mean X or Y or both. As a further example, "at least one of X, Y or Z" or "at least one of X, Y and Z" are intended to mean X or Y or Z or any combination thereof.

The foregoing description is intended to be exemplary rather than limiting. Modifications and improvements to the above-described implementations of the present technology may be apparent to those skilled in the art.

What is claimed is:

1. A computer-implemented method for generating adversarial examples, the method comprising:
accessing a set of inputs;
generating an instance of a variable auto-encoder (VAE), the VAE comprising an encoder and a decoder, the instance of the VAE encoding the set of inputs into latent representation elements associated with a latent space, the latent representation elements representing low geometric summaries establishing semantics associated with the set of inputs;
applying a manifold learning routine on the instance of the VAE to establish a characterization of a manifold in the latent space, the manifold being defined by the latent representation elements;
applying a perturbation routine to generate perturbed latent representation elements while constraining the perturbed latent representation elements to remain within the manifold;
generating adversarial examples based on the perturbed latent representation elements, the adversarial examples sharing a common semantics associated with the set of inputs; and
outputting the adversarial examples.

2. The method of claim 1, wherein the adversarial examples are generated so as to fool a classifier associated with a neural network.

3. The method of claim 1, wherein the adversarial examples are generated so as to reinforce a classifier associated with a neural network.

4. The method of claim 1, wherein the applying the manifold learning routine and the applying the perturbation routine are executed as a unified routine.

5. The method of claim 1, wherein the manifold learning routine comprises a variational inference routine executing learning of the manifold while minimizing assumptions about a distribution of the latent representation elements.

6. The method of claim 1, wherein the manifold learning routine comprises a Stein Variational Gradient Descent (SVGD) routine to learn the manifold.

7. The method of claim 1, wherein the perturbation routine comprise establishing a neighborhood of the latent representation elements which preserves semantics associated with the set of inputs.

8. The method of claim 1, wherein constraining the perturbed latent representation elements to remain within the manifold comprises applying a Gram-Schmidt Basis Sign Method (GBSM) routine.

9. The method of claim 8, wherein constraining the perturbed latent representation elements to remain within the manifold further comprises applying a manifold alignment routine.

10. The method of claim 1, wherein the generating adversarial examples is performed by the decoder and comprises operating an inversion routine to reconstruct the adversarial examples from the perturbed latent representation elements.

11. The method of claim 1, wherein the generating adversarial examples comprises optimizing a loss.

12. A system for generating adversarial examples, the system comprising:
at least one processor, and
memory storing a plurality of executable instructions which, when executed by the at least one processor, cause the system to:
access a set of inputs;
generate an instance of a variable auto-encoder (VAE), the VAE comprising an encoder and a decoder, the instance of the VAE encoding the set of inputs into latent representation elements associated with a latent space, the latent representation elements representing low geometric summaries establishing semantics associated with the set of inputs;
apply a manifold learning routine on the instance of the VAE to establish a characterization of a manifold in the latent space, the manifold being defined by the latent representation elements;
apply a perturbation routine to generate perturbed latent representation elements while constraining the perturbed latent representation elements to remain within the manifold;
generate adversarial examples based on the perturbed latent representation elements, the adversarial examples sharing a common semantics associated with the set of inputs; and
output the adversarial examples.

13. The system of claim 12, wherein the adversarial examples are generated so as to fool a classifier associated with a neural network.

14. The system of claim 12, wherein the adversarial examples are generated so as to reinforce a classifier associated with a neural network.

15. The system of claim 12, wherein the applying the manifold learning routine and the applying the perturbation routine are executed as a unified routine.

16. The system of claim 12, wherein the manifold learning routine comprises a variational inference routine executing learning of the manifold while minimizing assumptions about a distribution of the latent representation elements.

17. The system of claim 12, wherein the manifold learning routine comprises a Stein Variational Gradient Descent (SVGD) routine to learn the manifold.

18. The system of claim 12, wherein the perturbation routine comprise establishing a neighborhood of the latent representation elements which preserves semantics associated with the set of inputs.

19. The system of claim 12, wherein constraining the perturbed latent representation elements to remain within the manifold comprises applying a Gram-Schmidt Basis Sign Method (GBSM) routine.

20. The system of claim 19, wherein constraining the perturbed latent representation elements to remain within the manifold further comprises applying a manifold alignment routine.

* * * * *